US006352746B1

(12) United States Patent
Thiel

(10) Patent No.: US 6,352,746 B1
(45) Date of Patent: Mar. 5, 2002

(54) TREATED, ESPECIALLY PAINTED, SANDWICH

(75) Inventor: Edda Thiel, Melle (DE)

(73) Assignee: Beiersdorf AG, Hamburg (DE)

( * ) Notice: Subject to any disclaimer, the term of this patent is extended or adjusted under 35 U.S.C. 154(b) by 0 days.

(21) Appl. No.: 09/251,775

(22) Filed: Feb. 17, 1999

(30) Foreign Application Priority Data

Feb. 27, 1998 (DE) .......................................... 198 08 287

(51) Int. Cl.$^7$ ................................................ B05D 1/02
(52) U.S. Cl. ........................ 427/421; 118/504; 118/505; 248/467; 248/683; 427/259; 427/272; 427/282; 427/300
(58) Field of Search ................................ 428/40.1, 41.3, 428/41.8, 42.1, 192, 194; 248/467, 683; 427/421, 259, 272, 300, 282; 118/504, 505

(56) References Cited

U.S. PATENT DOCUMENTS 5,897,949 A * 4/1999 Luhmann .................. 428/317.3
5,928,747 A * 7/1999 Luhmann .................... 428/40.1
5,984,247 A * 11/1999 Luhmann .................. 248/205.3

FOREIGN PATENT DOCUMENTS

| DE | 33 31 016 | 10/1984 |
| DE | 42 17 771 | 12/1993 |
| WO | 92/11333 | 7/1992 |

* cited by examiner

*Primary Examiner*—Nasser Ahmad
(74) *Attorney, Agent, or Firm*—Norris McLaughlin & Marcus

(57) ABSTRACT

Treated, especially painted, sandwich of two or more joined parts, which a) is fixed with the formation of a spaced joint between the joined parts, where b) fixing of the parts to be joined takes place by means of an adhesive film which can be detached again by pulling in the direction of the bond plane, and c) the thickness of the spaced joint between the joined parts is determined by the thickness of the adhesive film, d) the untreated sandwich fixed in this way is treated in this form, and e) the treated joined parts are separable from one another without residue or damage by pulling on the adhesive film in the direction of the bond plane.

8 Claims, No Drawings

TREATED, ESPECIALLY PAINTED, SANDWICH

The invention relates to a treated, especially painted, sandwich, in which at least two parts to be joined are fixed reversibly, with the formation of a spaced joint.

For the treatment, especially painting, various means are known of fixing, protecting or masking the individual parts during the procedure.

For instance, self-adhesive masking tapes are on the market whose purpose is to protect areas that are not to be painted, but which have the disadvantage of sharp paint edges at the transition from unpainted to newly painted regions.

Circular foam strips in accordance with U.S. Pat. No. 5,260,097 have been proposed as an improvement on this and in the case of spray painting are intended to lead to a situation in which "the border forming the transition between the cushion which has just been removed and the treated surface can no longer be seen"(col. 5, lines 59–61). A fixing aid or the like, however, is not possible with such an arrangement.

DE 86 07 368 U1 discloses a masking tape made, in particular, of foamed material, having a projecting lip which guides the spray mist during painting in such a way that it "leads to a uniform, i.e. stepless transition between the old and the new coat of paint"(p. 1, lines 9/10 from bottom). With this tape, a further self-adhesive composition can be arranged on the top side so that masking material with a large expanse can be attached to it. Here again, fixing of further parts to be joined is possible only inadequately if at all.

However, in order to treat, and especially to paint, firmly fixed joined parts in such a way that, by virtue of a spaced joint, the results of treatment are free from transition in the adjacent, marginal regions, complex fixing is necessary-for instance, by means of screws, clamps, vices for brackets or brackets, which have to be removed again once treatment has taken place, which is laborious and also awkward. An elegant solution to such problems remains open.

The object of the invention was to remedy this situation and, in particular, to create a reversible fixing for parts to be joined, with a spaced joint, which in the course, for example, of spray painting gives rise to a smooth paint edge which does not require subsequent work.

This object is achieved by means of a sandwich as characterized in detail in the claims.

Particularly suitable adhesive films are those in accordance with DE 33 31 016, DE 42 22 849, DE 42 33 872, WO 92/11333 and WO 94/21157.

Thus DE 33 32 016 A1 describes an adhesive film for temporary adhesive bonds which allows an adhesive bond produced therewith to be separated by pulling on the adhesive film in the direction of the bond plane. Adhesive films of this type allow high bond strengths and shear strengths to be achieved and allow adhesively bonded assemblies to be separated again without further means, in a manner comparable to the opening of a preserving jar, similarly to how, in that case, the rubber seal is pulled by the grip tab out of the sealing join.

DE 42 22 849 C1 describes an adhesive film of this kind having a UV-permeable grip tab.

In addition, WO 92/11333 describes, inter alia, adhesive films for corresponding applications, where the adhesive films employed combine low elasticity with high extensibility.

In accordance with the invention it is also possible to employ double-sided self-adhesive tapes with a foam middle support made, for example, from polyethylene foam.

Regarding preparation, processing and handling of the particularly preferred adhesive films, general reference may be made to DE 33 31 016, DE 42 22 849 and WO 92/11333.

Examples of suitable parts to be joined are those made from wood, plastic, metal, ceramic, porcelain, glass or the like, such as complementary components, for instance a wooden door with an attachment for a window that is to be inserted later. In accordance with the invention, it is possible with particular advantage to paint such a door together with the said attachment, the attachment being bonded to the door by means of tesa power-strips® in the form of adhesive-film strips (55 mm long, 20 mm wide, 70 μm thick, with a 15 mm long grip tab) and the sandwich then being spray-painted in conventional manner. After drying/curing of the paint, the adhesive film is stripped off and the joined parts are available for use in undamaged form and without any aftertreatment.

A further special advantage is that the painted or treated sandwich can be transported easily and without any excess weight or bulky auxiliary arrangements before being taken apart when required at the appropriate location.

The above tesa power-strips® have proved to be particularly suitable, but so have longer products of that kind which extend over the entire length of the joined parts to be treated, while grip tabs project, in particular, at those points which subsequently disappear invisibly in the construction in any case.

A sandwich according to the invention is suitable not only for spray painting but also for coatings generally, such as powder coating, especially powder finishing, and also other types of surface treatment, such as sandblasting or the like.

Where greater thicknesses of the adhesive films, and hence of the spaced joint, are desired, it is possible to employ correspondingly thicker adhesive films of this type, or, alternatively, the tesa power-strips® obtainable commercially can be placed atop one another in multiples. In particular, however, adhesive films with a foamed backing, as described above, are suitable for thicker spaced joints.

What is claimed is:

1. A method of painting a combination of joined parts, said method comprising:

a) providing a combination comprising two or more parts bonded together in the form of a sandwich by an adhesive film, the adhesive film capable of being released from said parts without leaving a residue on said parts and without damaging said parts by pulling on the adhesive film in the direction of the plane of the bond formed between said adhesive film and said parts, the combination comprising a spaced joint between said parts, and the thickness of said spaced joint being determined by the thickness of said adhesive film; and b) painting said combination.

2. The method according to claim 1, wherein the adhesive film is elastically or plastically extensible.

3. The method according to claim 2, wherein the adhesive film contains an intermediate support.

4. The method according to claim 1, wherein the adhesive film exhibits an adhesion which is lower than its cohesion, the adhesion is significantly reduced when the film is extended, the adhesive film exhibits a ratio of peel force to tear load of at least 1:1.5, and the adhesive film is based on thermoplastic rubber and tackifier resins.

5. The method according to claim 1, wherein the adhesive film comprises an end which is designed as a grip tab, and the grip tab is provided on both sides with a covering or a non-tacky finish.

6. The method according to claim 1, wherein the adhesive film has a thickness of 60–2600 μm.

7. The method according to claim 6, wherein the adhesive film has a thickness of 70–1000 μm.

8. The method according to claim 1, wherein said painting is spray painting.

* * * * *